United States Patent
Murano et al.

(10) Patent No.: US 11,788,976 B2
(45) Date of Patent: Oct. 17, 2023

(54) X-RAY MEASUREMENT APPARATUS AND X-RAY MEASUREMENT METHOD

(71) Applicant: JEOL Ltd., Tokyo (JP)

(72) Inventors: Takanori Murano, Tokyo (JP); Fuminori Uematsu, Tokyo (JP)

(73) Assignee: JEOL Ltd., Tokyo (JP)

( * ) Notice: Subject to any disclaimer, the term of this patent is extended or adjusted under 35 U.S.C. 154(b) by 113 days.

(21) Appl. No.: 17/518,612

(22) Filed: Nov. 4, 2021

(65) Prior Publication Data

US 2022/0146442 A1     May 12, 2022

(30) Foreign Application Priority Data

Nov. 9, 2020   (JP) .................................. 2020-186559

(51) Int. Cl.
*G01N 23/2209* (2018.01)
*G01N 23/223* (2006.01)
*G06N 3/08* (2023.01)

(52) U.S. Cl.
CPC ....... *G01N 23/2209* (2018.02); *G01N 23/223* (2013.01); *G06N 3/08* (2013.01); *G01N 2223/0563* (2013.01)

(58) Field of Classification Search
CPC ............. G01N 23/2209; G01N 23/223; G01N 2223/0563; G06N 3/08
See application file for complete search history.

(56) References Cited

U.S. PATENT DOCUMENTS

2017/0184519 A1   6/2017  Sako
2021/0398254 A1*  12/2021 Oshikawa ................ G06N 3/08

FOREIGN PATENT DOCUMENTS

JP     2001176439 A     6/2001
JP     2019200126 A    11/2019
WO   WO-2015018850 A1 *  2/2015 ............. G01S 17/89

OTHER PUBLICATIONS

JFE Steel Corp—JP 2019-200126 A (cited in IDS dated Nov. 4, 2021)—Google Patents English obtained Apr. 18, 2023 (Year: 2023).*
Rank et al.—WO 2015-018850 A1—Google Patents English obtained Apr. 20, 2023 (Year: 2023).*
Extended European Search Report issued in EP21206472.9 dated Mar. 15, 2022.

* cited by examiner

*Primary Examiner* — David P Porta
*Assistant Examiner* — Casey Bryant
(74) *Attorney, Agent, or Firm* — THE WEBB LAW FIRM

(57) ABSTRACT

In a preliminary measurement, spectrums obtained by detecting characteristic X-rays emitted from preliminary measurement points are transmitted to a spectrum processing unit via a noise filter unit. In a main measurement, a spectrum obtained by detecting characteristic X-rays emitted from a main measurement point is transmitted to the spectrum processing unit by bypassing the noise filter unit. The noise filter unit includes a machine learning type filter constituted of a CNN or the like. In a learning process, teacher data are generated using artificially-generated noise.

7 Claims, 11 Drawing Sheets

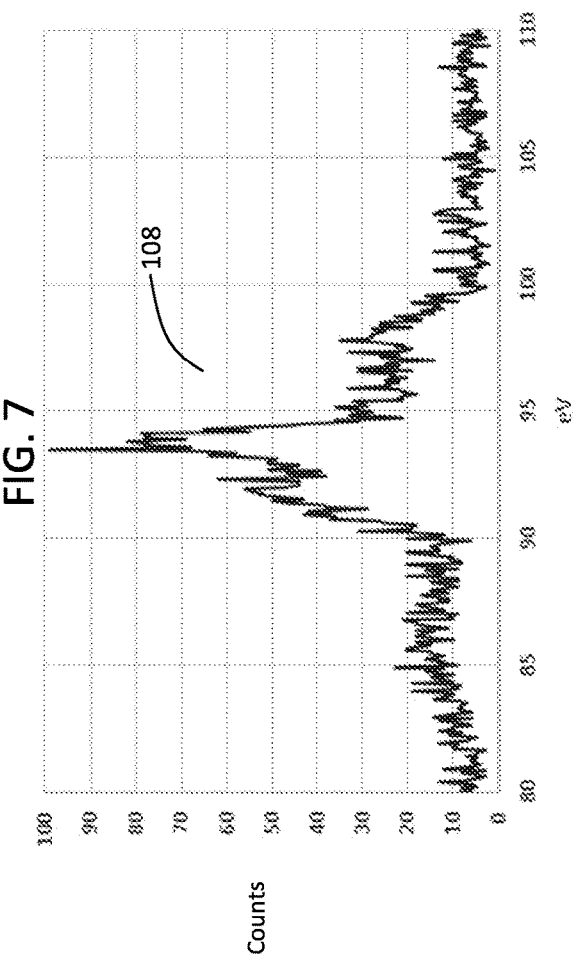
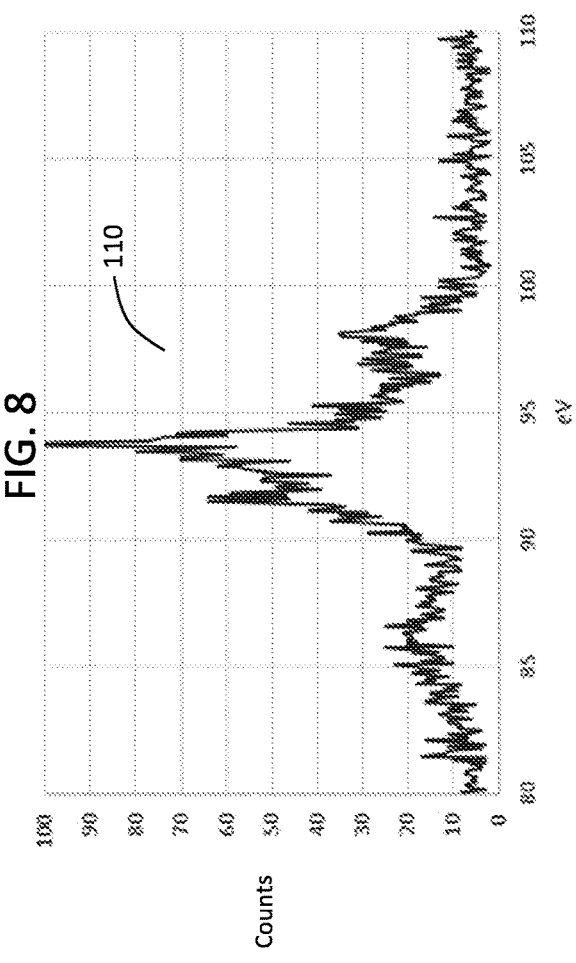

X-RAY MEASUREMENT APPARATUS AND X-RAY MEASUREMENT METHOD

CROSS REFERENCE TO RELATED APPLICATION

This application claims priority to Japanese Patent Application No. 2020-186559 filed Nov. 9, 2020, the disclosure of which is hereby incorporated by reference in its entirety.

BACKGROUND OF THE INVENTION

Field of the Invention

The present disclosure relates to an X-ray measurement apparatus and an X-ray measurement method, and more particularly to measurement of characteristic X-rays emitted from a sample.

Description of Related Art

As an X-ray measurement apparatus used for qualitative analysis or quantitative analysis of a sample, a characteristic X-ray measurement apparatus is known (see JP 2019-200126 A and JP 2001-176439 A). In a characteristic X-ray measurement apparatus, a characteristic X-ray spectrum is generated by detecting characteristic X-rays emitted from a sample, and based on an analysis of the characteristic X-ray spectrum, respective elements constituting the sample are identified, as are the amounts of the respective elements. A scanning electron microscope having a characteristic X-ray measurement function, an electron probe microanalyzer having a characteristic X-ray measurement function, and the like are also types of characteristic X-ray measurement apparatuses.

In recent years, devices for measuring characteristic X-rays belonging to a soft X-ray range, which is, for example, an X-ray range lower than several hundred eV, are also put into practice. By analyzing a spectrum of characteristic X-rays within the soft X-ray range, it is possible to ascertain a state, and particularly, a chemical bonding state, of a valence band of an atom.

In general, for the purpose of identifying, in a sample, a portion with respect to which a main measurement is to be performed, a preliminary measurement (i.e., a screening process for determining a main measurement point) is carried out before the main measurement. In the preliminary measurement, a plurality of preliminary measurement points are set on the sample, and characteristic X-ray spectrums obtained from the respective preliminary measurement points are analyzed. By two-dimensionally mapping the analysis results regarding the preliminary measurement points, a map showing a two-dimensional distribution of one or more elements is generated. The main measurement point is determined by an inspector who observes the map being displayed, or alternatively, is determined automatically based on an analysis of the generated map.

In the preliminary measurement; that is, in the screening process, in order to attain a certain analysis accuracy, it is desired to extend the measurement time for each preliminary measurement point to thereby increase the signal-to-noise ratio (or S/N ratio). However, when the measurement time for each preliminary measurement point is extended, the entire preliminary measurement disadvantageously requires a great amount of time.

The present disclosure is directed to reducing the preliminary measurement time. Alternatively, the present disclosure is directed to enabling the screening process to be carried out appropriately even when the preliminary measurement time is reduced.

SUMMARY OF THE INVENTION

An X-ray measurement apparatus according to the present disclosure includes: a control unit configured to set a group of preliminary measurement points on a sample in a preliminary measurement, and set a main measurement point on the sample in a main measurement; a spectrum generating unit configured to generate, in the preliminary measurement, a group of X-ray spectrums based on a group of detected signals obtained by detecting a group of X-rays emitted from the group of preliminary measurement points, and generate, in the main measurement, an X-ray spectrum based on a detected signal obtained by detecting X-rays emitted from the main measurement point; a noise filter unit configured to receive input of the group of X-ray spectrums in the preliminary measurement; and a processing unit configured to process, in the preliminary measurement, respective X-ray spectrums that are output from the noise filter unit, and process, in the main measurement, the X-ray spectrum that has bypassed the noise filter unit.

An X-ray measurement method according to the present disclosure includes: a preliminary measurement process including generating a group of characteristic X-ray spectrums based on a group of detected signals obtained by detecting a group of characteristic X-rays emitted from a group of preliminary measurement points set on a sample, inputting the group of characteristic X-ray spectrums into a noise filter unit, and processing a group of characteristic X-ray spectrums that are output from the noise filter unit; a setting process of setting a main measurement point on the sample based on a result of analysis of the group of characteristic X-ray spectrums; and a main measurement process including generating a characteristic X-ray spectrum based on a detected signal obtained by detecting characteristic X-rays emitted from the main measurement point, and processing or displaying the characteristic X-ray spectrum without transmitting the characteristic X-ray spectrum to the noise filter unit.

BRIEF DESCRIPTION OF THE DRAWINGS

Embodiment(s) of the present disclosure will be described based on the following figures, wherein:

FIG. 7 is a diagram showing a first example of a noise-containing spectrum;

FIG. 8 is a diagram showing a second example of a noise-containing spectrum;

DESCRIPTION OF THE INVENTION

Figure 1:
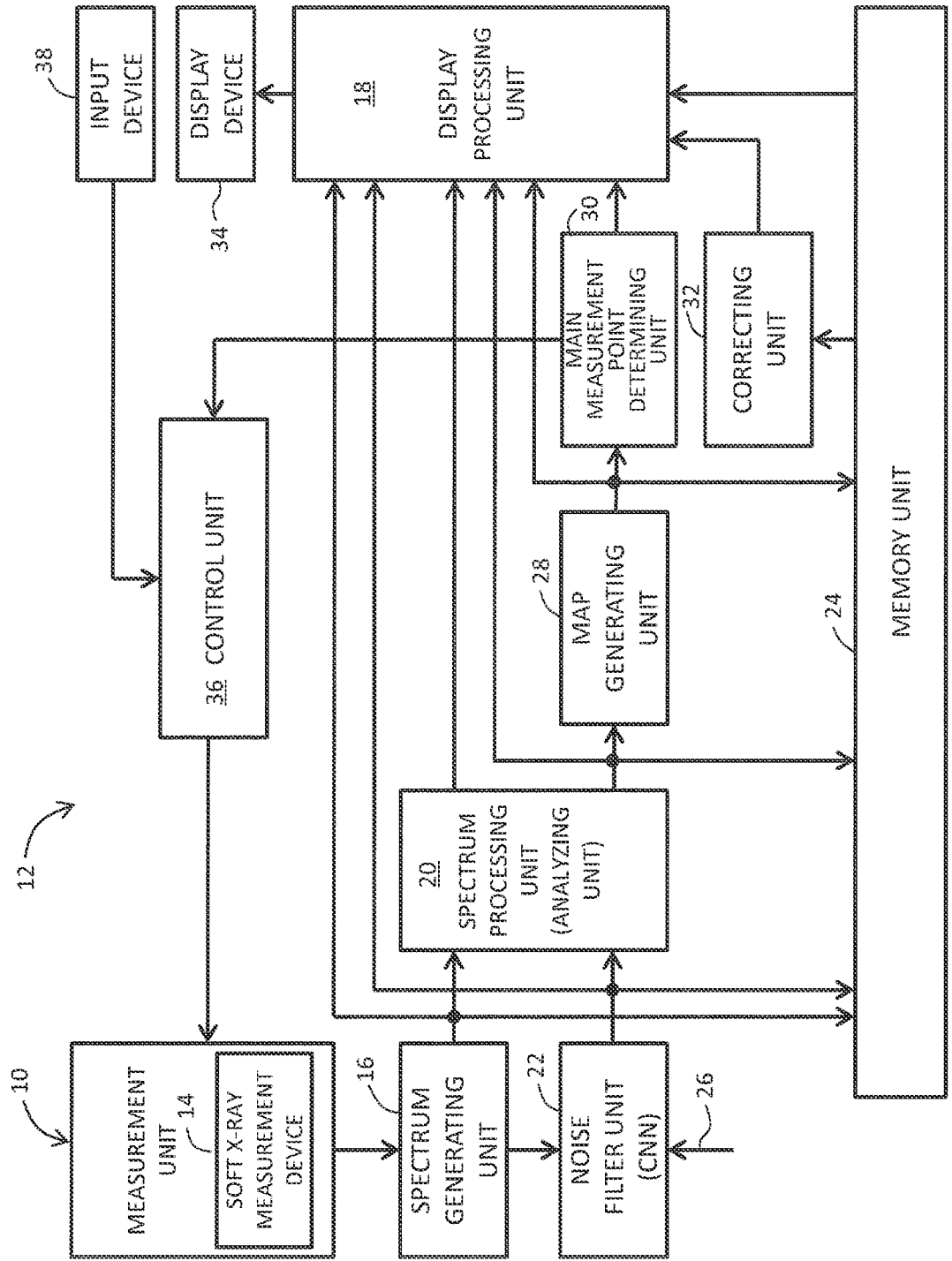
FIG. 1 is a block diagram showing an X-ray measurement apparatus according to an embodiment.

Embodiments will now be described by reference to the drawings.

(1) Overview of Embodiments

An X-ray measurement apparatus according to an embodiment comprises a control unit, a spectrum generating unit, a noise filter unit, and a processing unit. The control unit sets a group of preliminary measurement points on a sample in a preliminary measurement, and sets a main measurement point on the sample in a main measurement. The spectrum generating unit generates, in the preliminary measurement, a group of X-ray spectrums based on a group of detected signals obtained by detecting a group of X-rays emitted from the group of preliminary measurement points, and generates, in the main measurement, an X-ray spectrum based on a detected signal obtained by detecting X-rays emitted from the main measurement point. The noise filter unit receives input of the group of X-ray spectrums in the preliminary measurement. The processing unit processes, in the preliminary measurement, respective X-ray spectrums that are output from the noise filter unit, and processes, in the main measurement, the X-ray spectrum that has bypassed the noise filter unit. The control unit functions as a controller. The spectrum generating unit functions as a spectrum generator. The noise filter unit comprises at least one noise filter. The processing unit functions as a processor.

According to the above-described configuration, the noise filter unit functions in the preliminary measurement. That is, by means of the noise filter unit, noise included in the individual X-ray spectrums is reduced. After that, the group of X-ray spectrums output from the noise filter unit is processed. Even when the effect of the noise filter unit extends beyond the noise to the substance of the X-ray spectrums and thereby causes changes in the forms of the X-ray spectrums, such form changes are allowable so long as screening can be performed; i.e., so long as the main measurement point can be determined. After the preliminary measurement, the main measurement is executed. At that time, basically the noise filter unit does not function, and the X-ray spectrum obtained in the main measurement directly serves as the target of processing. In the main measurement, priority is placed on preservation of the X-ray spectrum. However, a general filter that is different from the above-described noise filter unit may be applied to the X-ray spectrum obtained in the main measurement.

As described above, the noise filter unit according to an embodiment is a filter unit provided exclusively for screening, which functions provisionally or temporarily. With the spectrum processing by the noise filter unit being a prerequisite, the measurement time for each preliminary measurement point can be reduced. Even when the measurement time is reduced, the screening can be performed appropriately.

In the above-described configuration, the same sample obviously is the target of measurement in the preliminary measurement and in the main measurement. The concept of the processing unit includes that of an analyzing unit, a display processing unit, and the like. In the preliminary measurement, an electron beam, an ion beam, or the like is irradiated on each preliminary measurement point sequentially selected from among the group of preliminary measurement points. Accordingly, in the preliminary measurement, the noise filter unit sequentially processes X-ray spectrums that are sequentially input. The X-rays to be measured in the present embodiment are characteristic X-rays and particularly characteristic X-rays belonging to a soft X-ray range. The noise filter unit is implemented as hardware or software.

In an embodiment, the noise filter unit includes a machine learning type filter that exhibits a noise reducing effect. The machine learning type filter is constituted of a learner such as a CNN (Convolutional Neural Network). In a learning process of the machine learning type filter, a spectrum containing artificially-generated noise may be used.

In an embodiment, the measurement time for each preliminary measurement point in the preliminary measurement is shorter than the measurement time for the main measurement point in the main measurement. According to this configuration, the duration of the entire preliminary measurement can be reduced, and the start point of the main measurement can be advanced. The measurement time generally corresponds to exposure time.

The X-ray measurement apparatus according to an embodiment includes a map generating unit configured to generate a map showing a composition distribution of the sample based on a result of analysis of the group of characteristic X-ray spectrums. Based on this map, the main measurement point is determined. The main measurement point may be designated by a user who referred to the map, or may be determined automatically based on an analysis of the map. The map generating unit functions as a map generator.

The X-ray measurement apparatus according to an embodiment comprises an X-ray measurement unit, which includes a plurality of wavelength dispersion devices that are selectively used, and which is configured to detect characteristic X-rays using a wavelength dispersion device selected from among the plurality of wavelength dispersion devices. The noise filter unit includes a plurality of noise filters corresponding to the plurality of wavelength dispersion devices. From among the plurality of noise filters, a noise filter corresponding to the selected wavelength dispersion device is selected. By providing the plurality of noise filters corresponding to the plurality of wavelength dispersion devices, the noise filter unit can be caused to function appropriately when the wavelength dispersion device used is switched. This configuration is devised in consideration of the possibility of the function or characteristics of the wavelength dispersion devices being manifested in spectrums.

An X-ray measurement method according to an embodiment comprises a preliminary measurement process, a setting process, and a main measurement process. In the preliminary measurement process, a group of characteristic X-ray spectrums are generated based on a group of detected signals obtained by detecting a group of characteristic X-rays emitted from a group of preliminary measurement points set on a sample, the group of characteristic X-ray spectrums are input into a noise filter unit, and a group of characteristic X-ray spectrums that are output from the noise filter unit are analyzed. In the setting process, a main measurement point is set on the sample based on a result of analysis of the group of characteristic X-ray spectrums. In the main measurement process, a characteristic X-ray spectrum is generated based on a detected signal obtained by detecting characteristic X-rays emitted from the main measurement point. The characteristic X-ray spectrum is analyzed or displayed without passing through the noise filter unit. The characteristic X-rays to be measured are, for example, characteristic X-rays belonging to a soft X-ray range. The characteristic X-rays are generated by irradiating an electron beam, an ion beam, an X-ray, or the like on the sample.

The X-ray measurement method according to an embodiment further comprises a filter generation process. In the filter generation process, a machine learning type filter is generated before the preliminary measurement process. In generating the machine learning type filter, the following machine learning method is performed.

A machine learning method according to an embodiment includes a step of generating a plurality of sets of teacher data, and a step of supplying the plurality of sets of teacher data to the machine learning type filter and causing the machine learning type filter to perform learning. Each set of teacher data is constituted of a characteristic X-ray spectrum serving as correct answer data, and a noise-containing characteristic X-ray spectrum generated by adding artificially-generated noise to the characteristic X-ray spectrum. According to this configuration, many sets of teacher data can be generated easily.

A program according to an embodiment has a generation function, a noise reduction function, and a processing function. The generation function is a function of generating, in a preliminary measurement, a group of X-ray spectrums based on a group of detected signals obtained by detecting a group of X-rays emitted from a group of preliminary measurement points set on a sample, and generating, in a main measurement, an X-ray spectrum based on a detected signal obtained by detecting X-rays emitted from a main measurement point set on the sample. The noise reduction function is a function of applying a noise reduction processing to the group of X-ray spectrums in the preliminary measurement. The processing function is a function of processing, in the preliminary measurement, a group of X-ray spectrums to which the noise reduction processing has been applied, and processing, in the main measurement, the X-ray spectrum that has bypassed the noise reduction processing.

(2) Details of Embodiments

FIG. 1 discloses an X-ray measurement apparatus according to an embodiment. The X-ray measurement apparatus specifically is a scanning electron microscope having a soft X-ray measurement function. As another example of X-ray measurement apparatus, an electron probe microanalyzer using a soft X-ray measurement function can be cited.

The X-ray measurement apparatus comprises a measurement unit 10 and an information processing unit 12. In an embodiment, the measurement unit 10 includes a soft X-ray measurement device 14. The configuration of the measurement unit 10 is described in detail further below using FIG. 2. The information processing unit 12 is constituted of, for example, a computer. The information processing unit 12 includes a processor that executes a program. In FIG. 1, functions exhibited by the processor are represented by blocks. The processor is, for example, a CPU.

A spectrum generating unit 16 generates an X-ray spectrum based on a detected signal output from the soft X-ray measurement device 14. In a preliminary measurement serving as a screening process, an array of preliminary measurement points is set on a sample, and regarding each preliminary measurement point constituting the array, characteristic X-rays emitted therefrom are detected. Based on this detection, a spectrum is generated for each preliminary measurement point. For the entire array of preliminary measurement points, a group of spectrums comprising a plurality of spectrums is generated. In a main measurement carried out after the preliminary measurement, a main measurement point is set on the sample, and by detecting characteristic X-rays emitted from the main measurement point, a spectrum is generated. This spectrum is analyzed or displayed.

Each of the individual preliminary measurement points and the main measurement point may be a region having a certain extent of area. In the main measurement, a plurality of main measurement points may be determined.

In the preliminary measurement, the plurality of spectrums generated in the spectrum generating unit 16 are sequentially transmitted to a spectrum processing unit 20 via a noise filter unit 22. In the main measurement, the spectrum generated in the spectrum generating unit 16 does not pass through but rather bypasses the noise filter unit 22, and is transmitted to the spectrum processing unit 20.

As noted above, the noise filter unit 22 is a unit that functions in the preliminary measurement, and does not function in the main measurement. The noise filter unit 22 includes at least one noise filter. The noise filter is implemented as a learned learner, and is for example constituted of a CNN. In the preliminary measurement, noise overlapping the individual spectrums is removed by the noise filter. Conversely stated, the learner is supplied with learned data 26 so that such a noise removal effect can be obtained. The learned data 26 are a learned model, and are, for example, constituted of a set of CNN parameters.

The spectrum processing unit 20 functions as an analyzing unit. In the preliminary measurement, the spectrum processing unit 20 analyzes the individual spectrums. More specifically, the spectrum processing unit 20 identifies respective elements constituting the sample, and determines the amounts of the respective elements. In the main measurement, as necessary, the spectrum processing unit 20 identifies the respective elements constituting the sample with higher accuracy, and determines the amounts of the respective elements with higher accuracy. In the main measurement, a state, which may for example be a chemical bonding state, of a valence band of an atom may be analyzed based on the form of the spectrum. A plurality of features of characteristic X-rays (such as the L line and K line of a specific element) included in the spectrum may be analyzed. As the spectrum analysis method, various methods can be cited.

A map generating unit 28 generates, in the preliminary measurement, a map showing a two-dimensional distribution of one or more elements in the sample based on a result of analysis of the group of spectrums. Further, a map may be generated in the main measurement.

A main measurement point determining unit 30 is a unit that automatically determines a main measurement point based on a map. For example, a center point in a region where a specific element is present is identified, and this center point is determined as a main measurement point. The map may be displayed on a screen, and a user may designate the main measurement point on the displayed map. Coordinate information of the main measurement point is transmitted from the main measurement point determining unit 30 to a control unit 36.

In the preliminary measurement, a display processing unit 18 is supplied with the group of spectrums before passing through the noise filter unit 22, the group of spectrums after passing through the noise filter unit 22, signal analysis results, the map, the coordinates of the main measurement point, and so on. In the main measurement, the display processing unit 18 is supplied with the spectrum, signal analysis results, and so on. The display processing unit 18 generates images to be displayed on a display device 34. The display processing unit 18 has a color processing function, an image synthesis function, and the like.

A memory unit 24 is composed of a semiconductor memory or the like. In the preliminary measurement, the memory unit 24 stores the group of spectrums before passing through the noise filter unit 22, the group of spectrums after passing through the noise filter unit 22, signal analysis results, the map, and so on. In the main measurement, the memory unit 24 stores the spectrum, signal analysis results, the map, and so on. A correcting unit 32 serves to correct data obtained in the preliminary measurement based on data obtained in the main measurement. For example, the spectrums and map generated in the preliminary measurement are corrected by the correcting unit 32 in accordance with results of the main measurement.

The control unit 36 is a controller that controls operation of respective elements constituting the X-ray measurement apparatus. The control unit 36 functions as a means for setting the group of preliminary measurement points and the main measurement point, a means for controlling a movable stage, a means for controlling an irradiation position of an electron beam, and so on. An input device 38 is connected to the control unit 36. Using the input device 38, the position of the main measurement point can be designated. The input device 38 is composed of a keyboard, a pointing device, and the like. The display device 34 is composed of, for example, an LCD.

Figure 2:
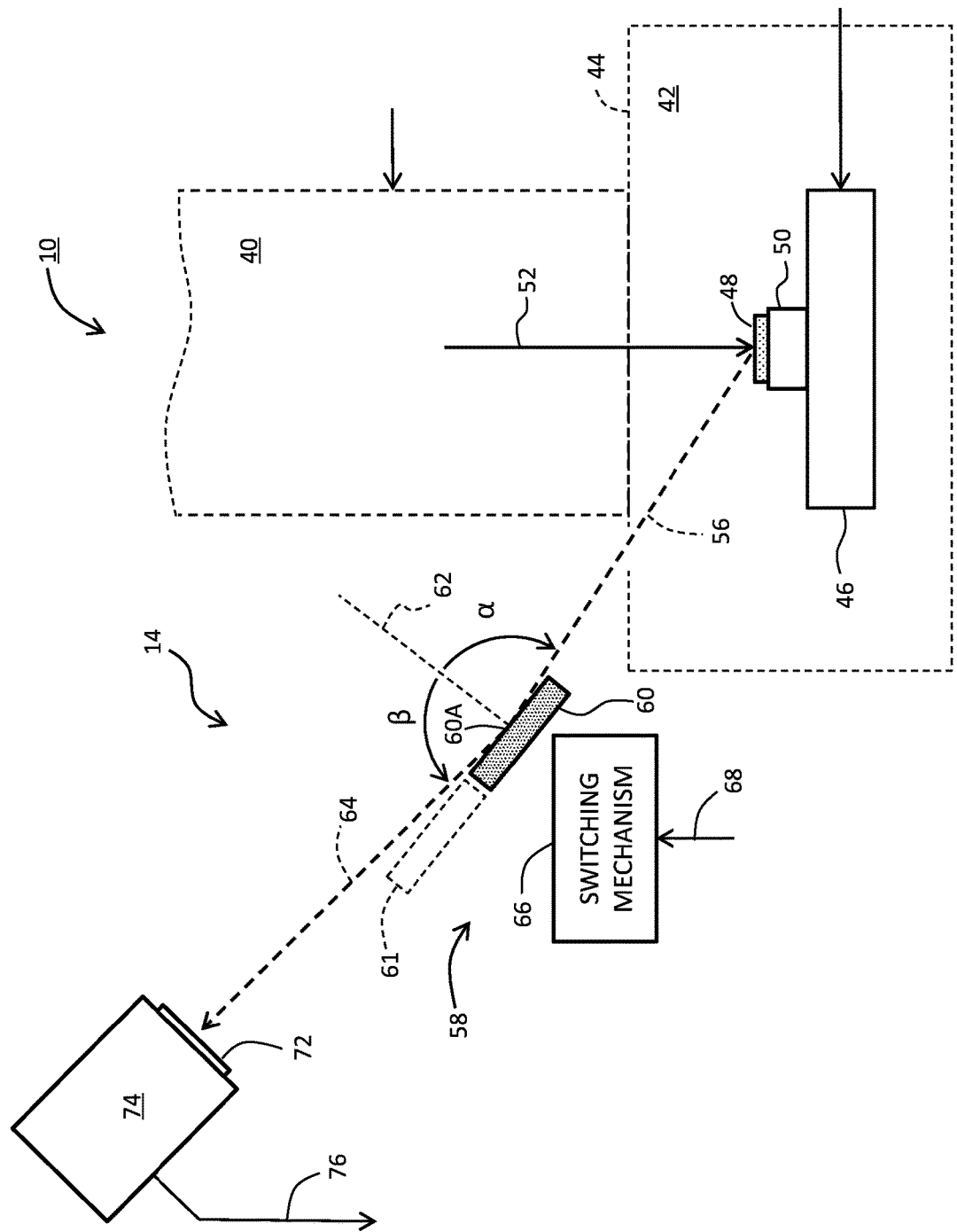
FIG. 2 is a diagram showing an example configuration of a measurement unit.

FIG. 2 shows an example configuration of the measurement unit 10. The measurement unit 10 shown comprises an optical column 40, a housing 44, and the soft X-ray measurement device 14. The optical column 40 contains an electron gun, a lens system, a deflector, and the like. The interior of the housing 44 is a sample chamber 42. In the sample chamber 42, a movable stage 46 is provided. A holder 50 that holds a sample 48 is fixed to the movable stage 46.

An electron beam 52 is irradiated on a measurement point (i.e., a preliminary measurement point or a main measurement point) on the sample 48. As a result, characteristic X-rays are emitted from the measurement point. For example, soft X-rays having an energy lower than 300 eV, 200 eV, or 100 eV are measured by the soft X-ray measurement device 14. The lower limit of the measurement range is, for example, several tens of eV, and may specifically be 25 eV, 50 eV, or the like.

The soft X-ray measurement device 14 is a wavelength dispersive soft X-ray measurement device. The soft X-ray measurement device 14 includes a wavelength dispersion device 58, a CCD (or CCD camera) 72, a controller 74, and so on. The wavelength dispersion device 58 includes a plurality of diffraction gratings 60, 61, a switching mechanism 66, and so on. Each of the diffraction gratings 60, 61 is a spectrometer.

The diffraction grating 60 exhibits a wavelength dispersion function in an energy range of, for example, 50 to 170 eV. The diffraction grating 61 exhibits a wavelength dispersion function in an energy range of, for example, 70 to 210 eV. These diffraction gratings 60, 61 are selectively used. The switching mechanism 66 is a mechanism that selects the diffraction grating 60, 61 to be used. The diffraction grating 60, 61 to be used is switched by rotational movement or linear movement.

At a surface 60A of each diffraction grating 60, 61, a plurality of grooves are formed at non-uniform intervals in order to suppress aberration. With respect to an incident X-ray 56, an output X-ray 64 is generated at an output angle depending on the wavelength. In FIG. 2, the incident angle of the incident X-ray 56 is denoted by α, and the output angle of the output X-ray 64 is denoted by β. Reference numeral 62 denotes a center line which is a line normal to the surface 60A. Here, the surface 60A is slightly curved.

Reference numeral 68 denotes a signal for controlling the operation of the switching mechanism 66. Reference numeral 76 denotes a detected signal. The CCD 72 has a plurality of detection elements that are arranged two-dimensionally. For each wavelength; that is, for each row of detection elements, a plurality of detected signals are integrated. Based on the detected signal 76 output from the controller 74, spectrums are generated.

Figure 3:
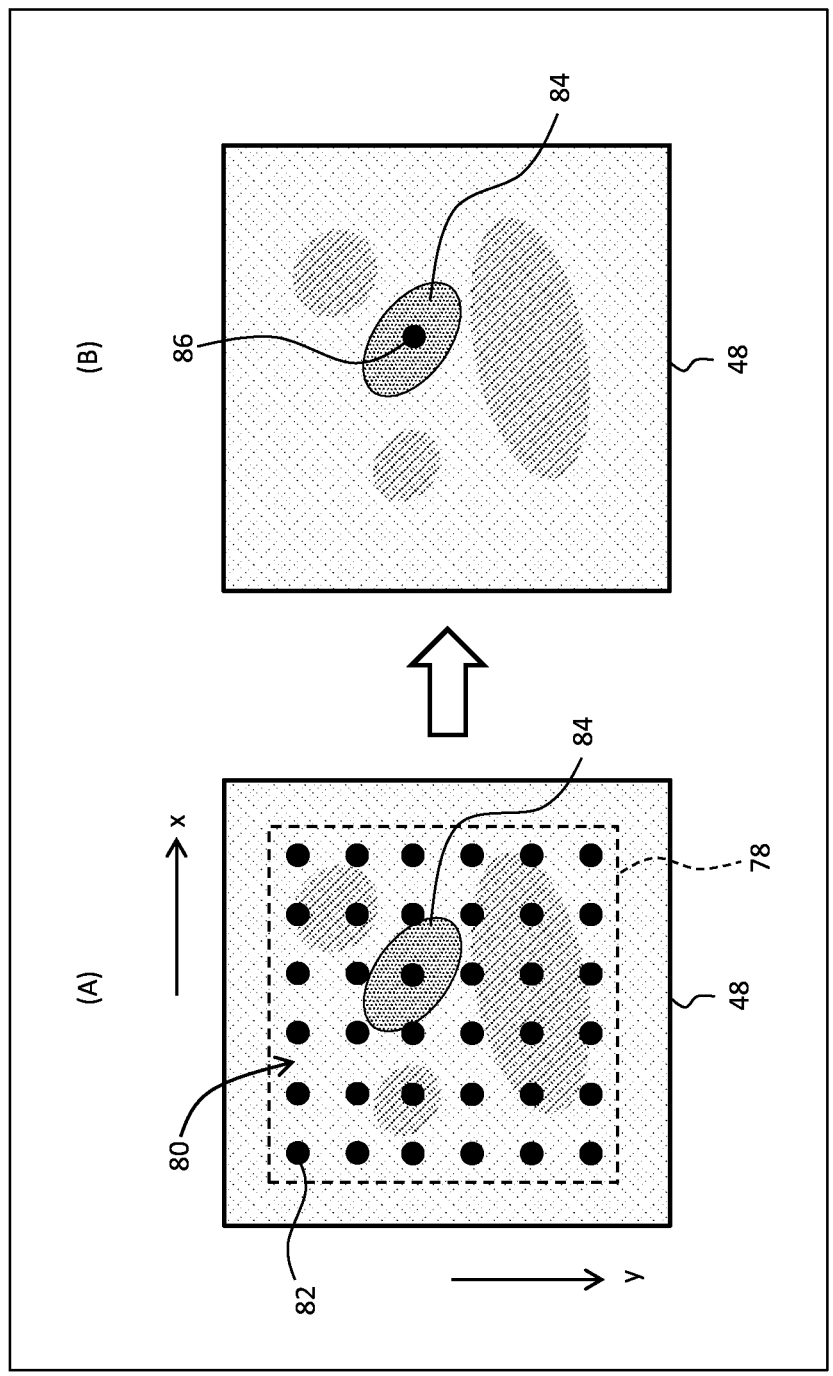
FIG. 3 is a diagram showing a group of preliminary measurement points and a main measurement point.

In FIG. 3, a preliminary measurement is illustrated in (A). In the preliminary measurement, an observation area 78 is set on the sample 48, and within the observation area 78, a preliminary measurement point group (i.e., an array of preliminary measurement points) 80 is set. In FIG. 3, a main measurement is illustrated in (B). In the main measurement, a main measurement point 86 is set on the sample 48. Specifically, in the preliminary measurement, the preliminary measurement point group 80 which comprises a plurality of preliminary measurement points 82 arranged in the x-direction and the y-direction is set. For example, the preliminary measurement point group 80 is composed of 128×128 preliminary measurement points 82. Although the preliminary measurement points 82 are usually densely set, in FIG. 3, intervals between the preliminary measurement points 82 are widened for simplicity of illustration. Based on a map generated in the preliminary measurement, a specific portion 84, for example, is selected as the target of the main measurement.

Specifically, in the main measurement, the center of the specific portion 84 is designated as the main measurement point 86 by an inspector. A plurality of main measurement points may be designated. The main measurement point 86 may be set automatically based on the map.

The measurement time for each of the preliminary measurement points is a first duration, which is a short time. The measurement time for the main measurement point is a second duration, which is a long time. The second duration corresponds, for example, to several times to several tens of times the first duration, or to several hundred or more times the first duration.

If the first duration is set to a duration identical or close to the second duration in order to obtain a good S/N ratio, a great amount of time would disadvantageously be required for the entire preliminary measurement. Degradation of the sample and changes in the environment that occur during that time would be problematic. According to an embodiment, in the preliminary measurement, the noise filter unit is caused to function, and noise included in each spectrum is reduced by the noise filter unit, so that the apparent S/N ratio is enhanced. Accordingly, even when the first duration is considerably shortened, a map for screening can be generated. Although there are possibilities that the true spectral components become lost by the effect of the noise filter unit, for screening purposes only, such slight inconveniences are allowable. In addition, as explained further below, since it is sufficient to simply configure the filter to possess an effect appropriate for screening, a large amount of teacher data for learning, which is required at the learning stage of the filter, can be easily generated. Here, the first duration and the second duration are determined depending on the sample, accelerating voltage, observed range of energy, element sensitivity, and the like.

Figure 4:
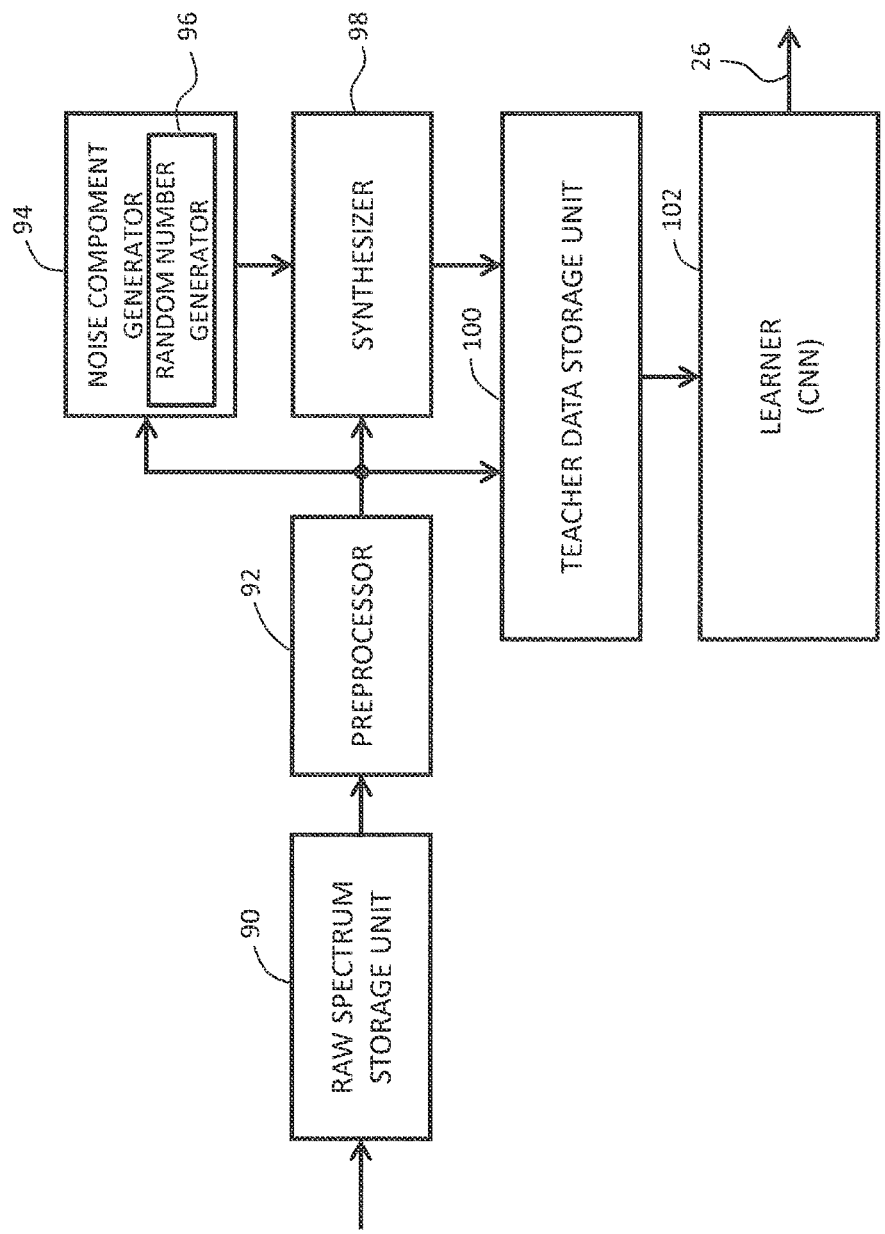
FIG. 4 is a diagram for explaining a learning method.

FIG. 4 illustrates a method of generating learned data (i.e., a set of CNN parameters) to be stored in the noise filter unit. The learned data may be generated using a computer inside the X-ray measurement apparatus, or using any other computer. Blocks shown in FIG. 4 except for those representing a raw spectrum storage unit 90 and a teacher data storage unit 100 correspond to a plurality of functions exhibited by the processor.

The raw spectrum storage unit 90 is composed of a memory that stores a raw spectrum. As the raw spectrum, it is possible to use a spectrum that was obtained in the past using a long duration and that includes little noise. The wavelength range of the spectrum is selected to match the wavelength range of the X-ray diffraction gratings. A spectrum obtained from a standard sample that resembles an actual sample may be used as the raw spectrum. A plurality of raw spectrums may be stored in the raw spectrum storage unit 90.

A preprocessor 92 is a unit that multiplies the raw spectrum read out from the raw spectrum storage unit 90 by a coefficient for adjusting its intensity. For example, the raw spectrum is multiplied by 0.1. This results in obtaining a spectrum corresponding to a spectrum obtained in a duration of $\frac{1}{10}$ of the measurement time. A different value may be used as the coefficient to be multiplied. The spectrum after multiplying the coefficient serves as a standard spectrum, and is employed as a correct answer spectrum.

A noise component generator 94 is a unit that generates noise (i.e., a plurality of noise spikes serving as noise components) to be superimposed on the standard spectrum. For each wavelength (i.e., each energy) in the standard spectrum, a random number generator 96 generates a random number according to a Poisson distribution. The individual intensities constituting the standard spectrum serve as the center of the respective Poisson distributions. The noise is constructed using the plurality of random numbers corresponding to the plurality of wavelengths. A synthesizer 98 synthesizes the noise artificially generated as described above with the standard spectrum and thereby generates a noise-containing spectrum.

A spectrum pair comprising the correct answer spectrum, which is the standard spectrum, and the noise-containing spectrum generated therefrom constitutes a set of teacher data (or a set of training data). The teacher data are stored in a teacher data storage unit 100. Theoretically, the noise component generator 94 can generate an infinite number of noises. In other words, a sufficient number of sets of teacher data can be easily generated.

A learner 102 is constituted of a CNN, and by sequentially supplying a large number of sets of teacher data to the learner 102, the learner 102 itself performs learning. In other words, when noise-containing spectrums are input, a set of CNN parameters is gradually optimized such that the output from the learner 102 becomes closer to the correct answer spectrum. The finally-obtained learned data 26 are provided to the noise filter unit constituted of a CNN.

Figure 5:
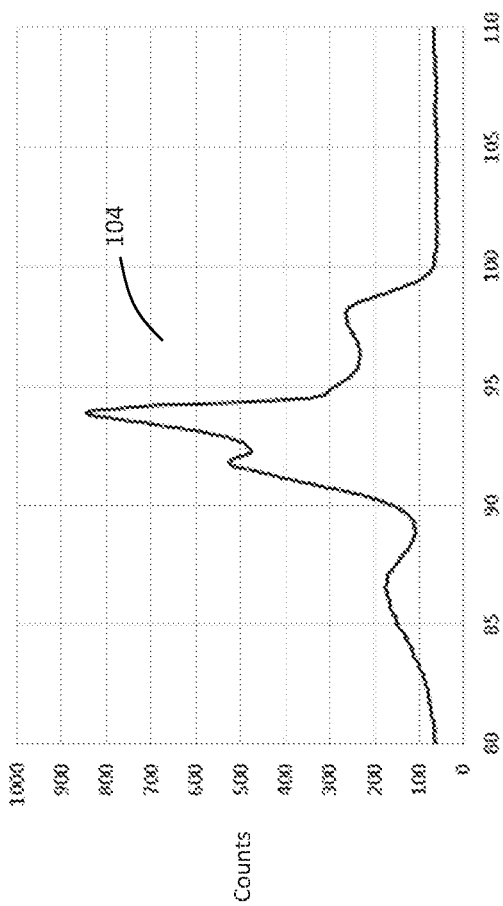
FIG. 5 is a diagram showing a raw spectrum.
Figure 6:
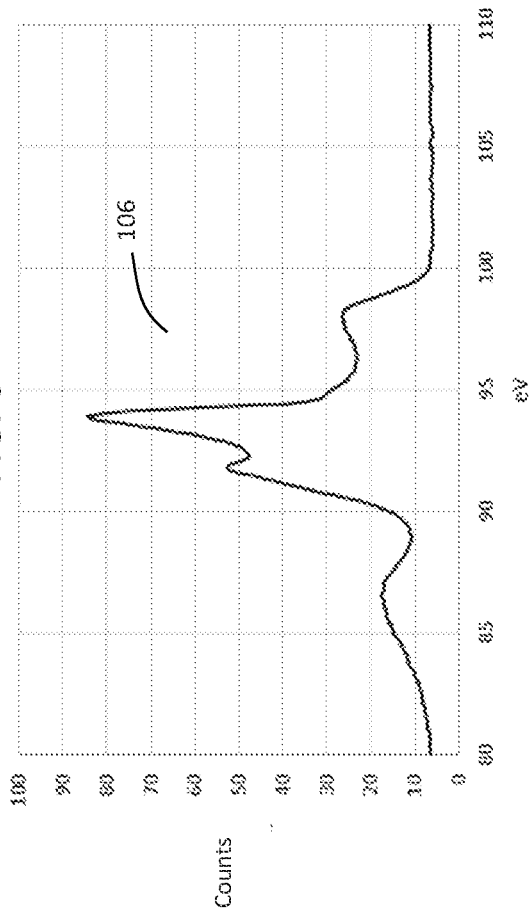
FIG. 6 is a diagram showing a spectrum after amplitude adjustment.
Figure 9:
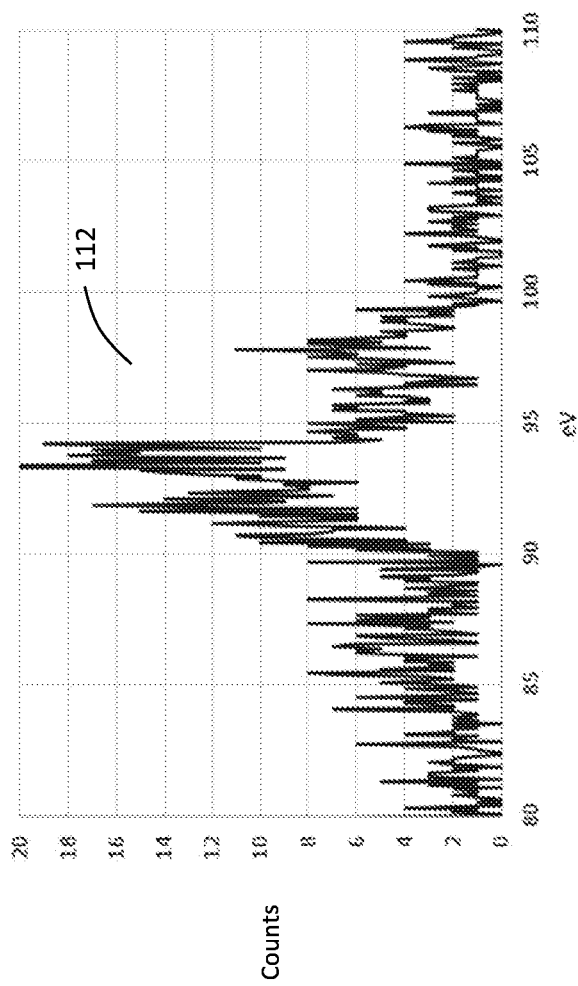
FIG. 9 is a diagram showing a third example of a noise-containing spectrum.

FIG. 5 shows an example raw spectrum 104. FIG. 6 shows an example standard spectrum 106. FIG. 7 shows a first example of a noise-containing spectrum. FIG. 8 shows a second example of a noise-containing spectrum. The standard spectrum included in the respective noise-containing spectrums 108, 110 of FIGS. 7 and 8 is generated by multiplying the raw spectrum by a coefficient of 0.1. FIG. 9 shows a noise-containing spectrum 112 according to a third example. The standard spectrum included therein is generated by multiplying the raw spectrum by a coefficient of 0.02.

Figure 10:
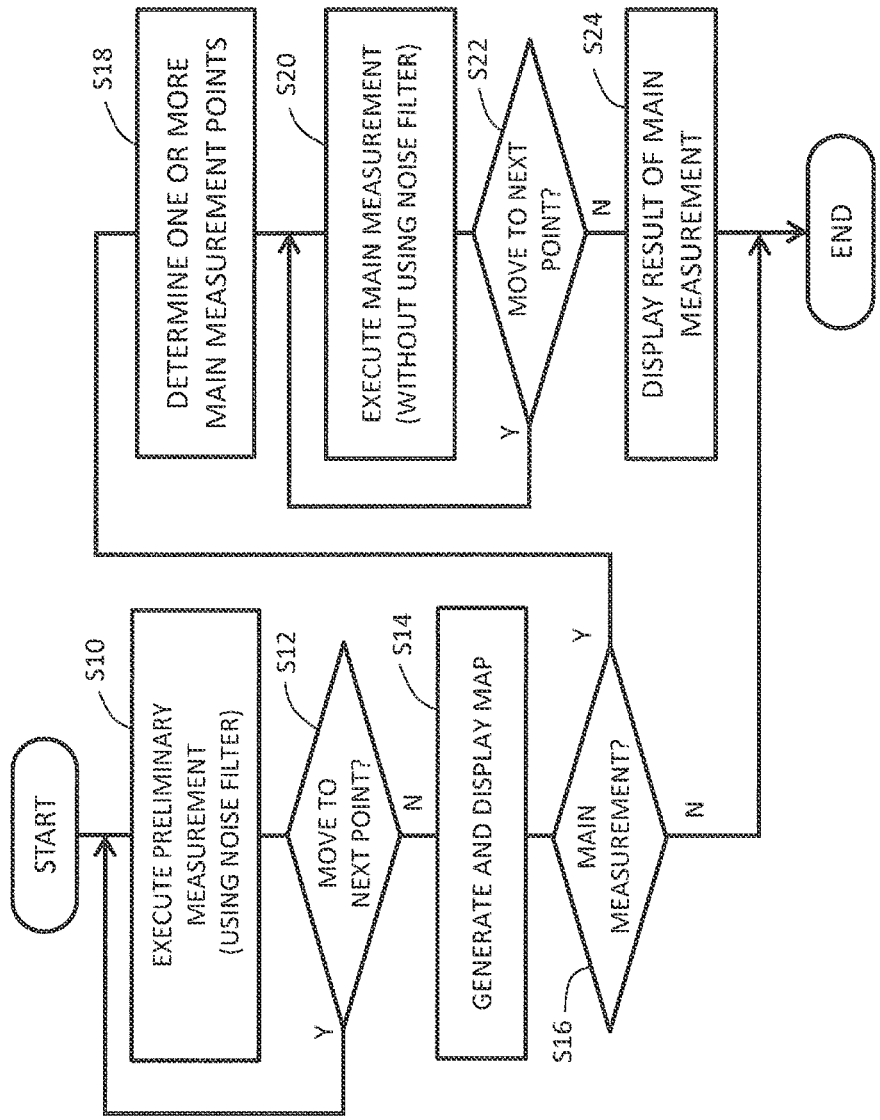
FIG. 10 is a flowchart illustrating an example operation.

FIG. 10 shows an example operation of the X-ray measurement apparatus. In S10, the preliminary measurement is carried out. The measurement time for each of the preliminary measurement points is a short duration. With respect to a selected preliminary measurement point, an electron beam is irradiated, and characteristic X-rays emitted from the preliminary measurement point are detected. In the preliminary measurement, the noise filter unit functions. S10 is repeatedly executed until it is judged in S12 that measurement regarding all preliminary measurement points is completed. The spectrums obtained from the respective preliminary measurement points are transmitted to the noise filter unit, and noise included in the spectrums is reduced. After that, the individual spectrums are analyzed.

In S14, a map is generated based on the result of analysis of the group of spectrums obtained from the group of preliminary measurement points, and the map is displayed. When, in S16, a portion in the sample where detailed measurement should be made is found and therefore it is judged that a main measurement should be carried out, one or more main measurement points are determined in S18. The position of the main measurement point is designated by the user or determined automatically based on the map.

In S20, the main measurement is carried out. With respect to the main measurement point, an electron beam is irradiated, and characteristic X-rays emitted from the main measurement point are detected. The measurement time for the main measurement point is a long duration. In the main measurement, the spectrum is not transmitted to the noise filter unit. That is, the noise filter unit is bypassed. When a plurality of main measurement points are set, S20 is repeatedly executed. When it is judged in S22 that the main measurement is completed, a result of the main measurement is displayed in S24. At that time, the spectrum obtained in the main measurement may be displayed, or a result of analysis of the spectrum may be displayed.

Figure 11:
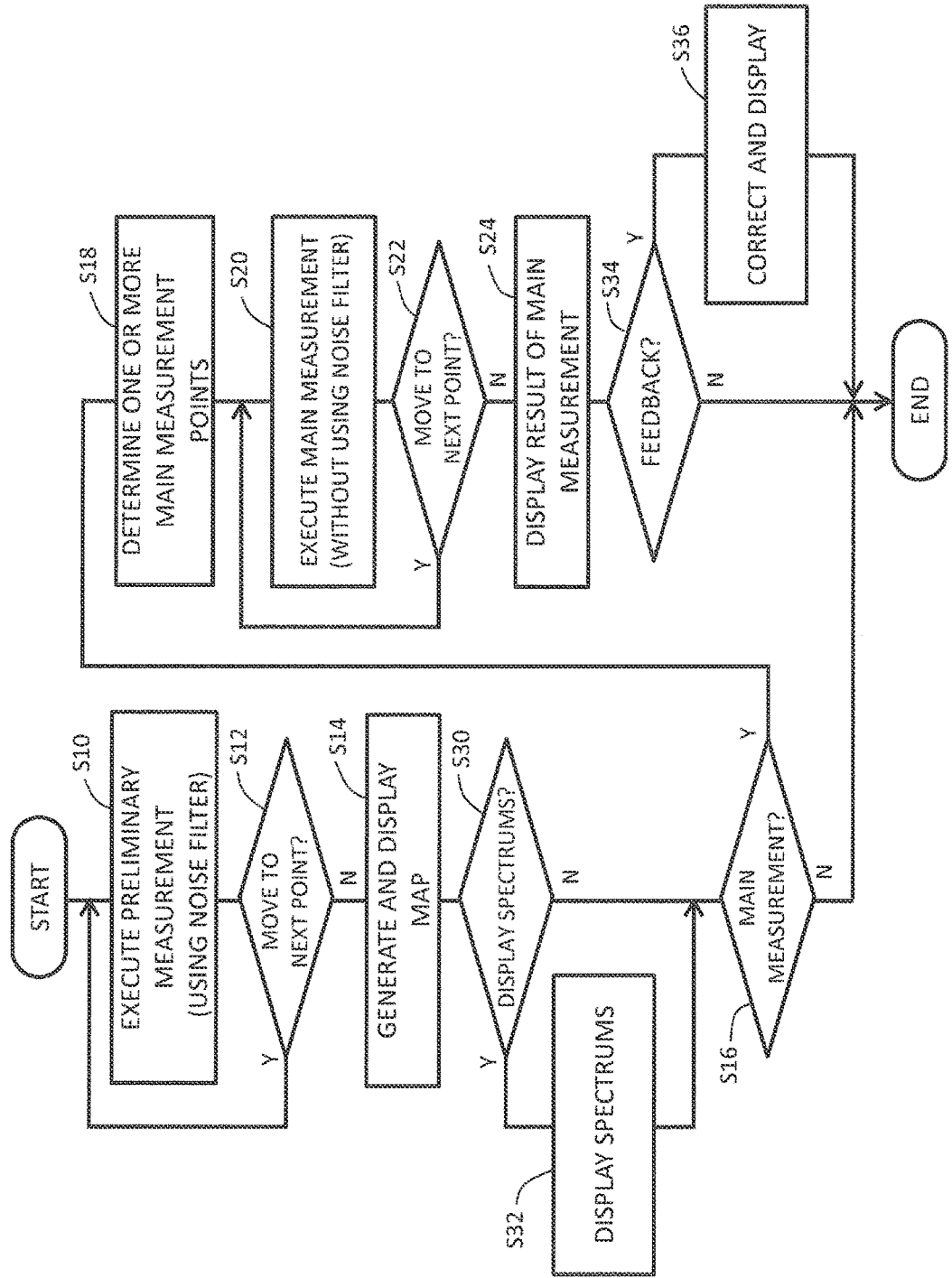
FIG. 11 is a flowchart illustrating an example operation according to a modified embodiment.

FIG. 11 illustrates a modified embodiment. Steps identical to those shown in FIG. 10 are labeled with the same step reference numerals, and description thereof will not be repeated.

In S30, a judgment is made regarding whether or not to display a spectrum obtained in the preliminary measurement. In S32, a spectrum selected by the user is displayed. At that time, a plurality of spectrums may be displayed. It may be configured such that, as the spectrum to be displayed, either one of the spectrum before the filter processing or the spectrum after the filter processing is selectable. A judgment regarding whether or not to carry out the main measurement may be made by observing the spectrum together with the map.

In S34, a judgment is made regarding whether or not to perform feedback using the result of the main measurement. In a case of performing feedback, in S36, the spectrums and map obtained in the preliminary measurement are corrected based on the result of the main measurement. The spectrums and map after the correction are displayed. As the correction method, various methods can be used.

Figure 12:
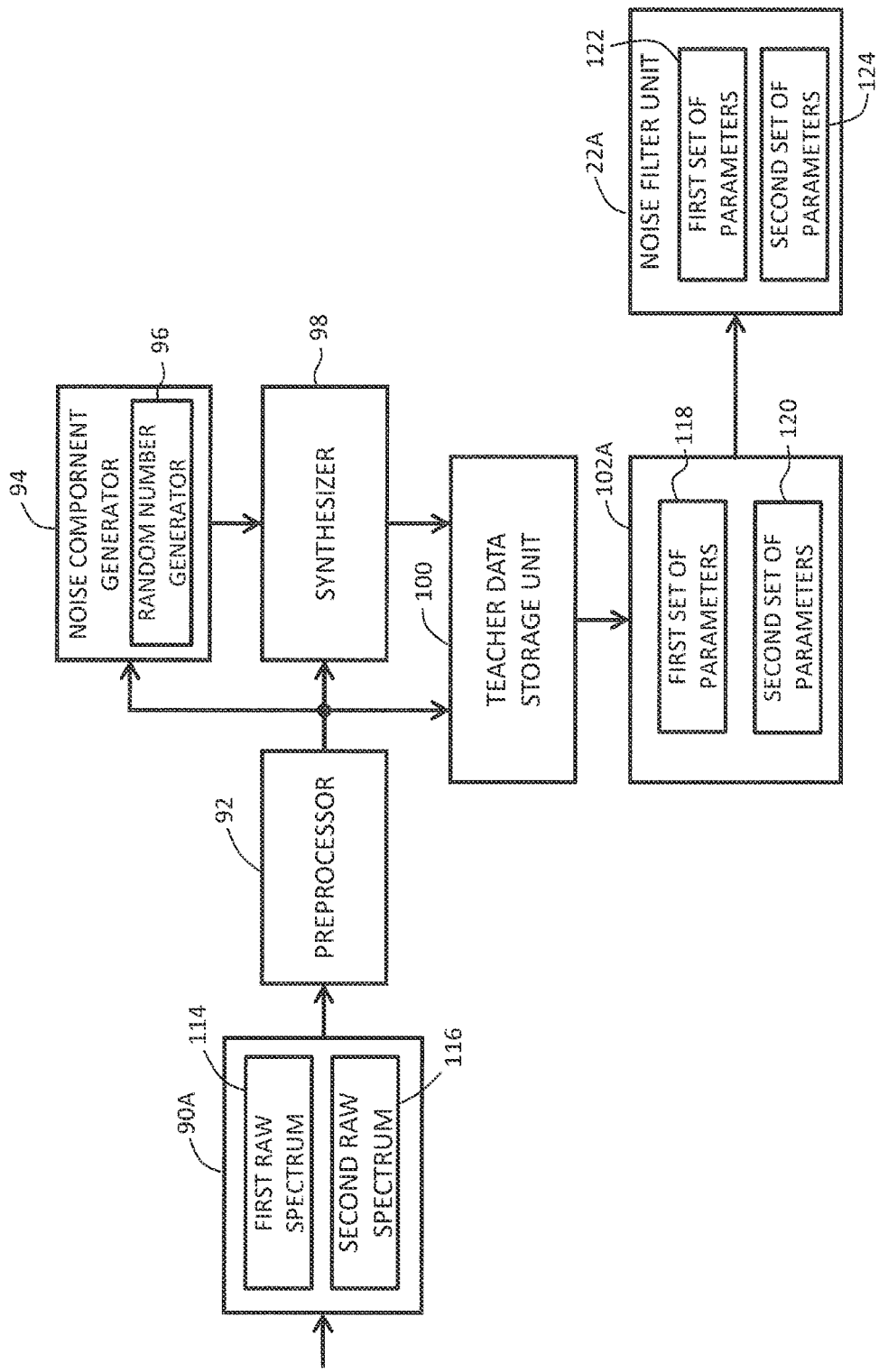
FIG. 12 is a diagram for explaining another learning method.

FIG. 12 shows a configuration according to a modified embodiment. In this modified embodiment, a plurality of noise filters are provided corresponding to a plurality of X-ray diffraction gratings. A noise filter corresponding to the X-ray diffraction grating used is selectively employed. In FIG. 12, elements identical to those shown in FIG. 4 are labeled with the same reference numerals, and description thereof will not be repeated.

A raw spectrum storage unit 90A has stored therein a first raw spectrum 114 and a second raw spectrum 116. The first raw spectrum 114 is a spectrum obtained using a first diffraction grating. The second raw spectrum 116 is a spectrum obtained using a second diffraction grating. Based on the first raw spectrum 114, first noise-containing spectrums are generated, and first sets of teacher data are thereby produced. Based on the second raw spectrum 116, second noise-containing spectrums are generated, and second sets of teacher data are thereby produced. A large number of first sets of teacher data and a large number of second sets of teacher data are generated, and these sets of teacher data are stored in the teacher data storage unit 100.

The large number of first sets of teacher data read out from the teacher data storage unit 100 are supplied to a learner 102A, and learning of the learner 102A is carried out. As a result, a first set of parameters 118 serving as first learned data is generated, and is supplied to a noise filter unit 22A. The supplied first set of parameters is labeled with reference numeral 122. The large number of second sets of teacher data read out from the teacher data storage unit 100 are supplied to the learner 102A, and learning of the learner 102A is carried out. As a result, a second set of parameters 120 serving as second learned data is generated, and is supplied to the noise filter unit 22A. The supplied second set of parameters is labeled with reference numeral 124.

The noise filter unit 22A has two noise filters, or more specifically, has the first set of parameters 122 and the second set of parameters 124. The noise filter; i.e., the set of parameters, that corresponds to the X-ray diffraction grating used is selected. This selection is performed in the control unit.

Figure 13:
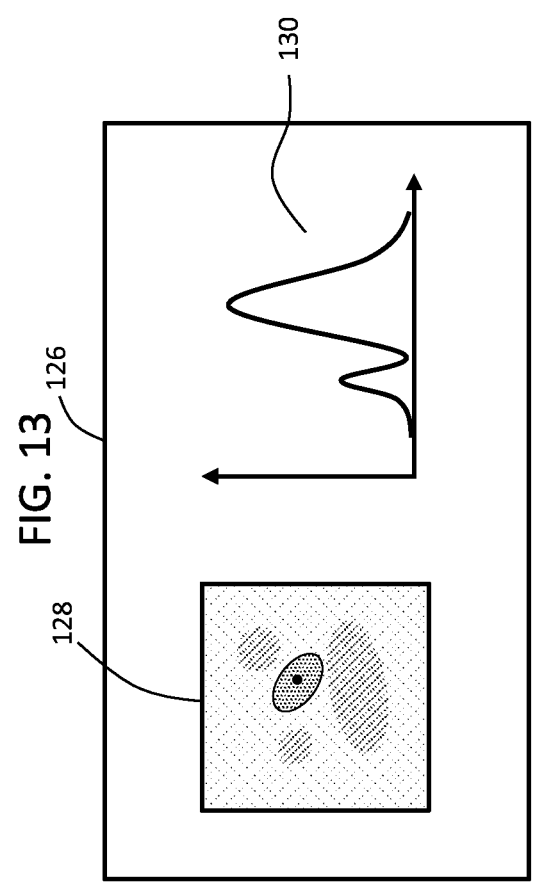
FIG. 13 is a diagram showing a first example display.
Figure 14:
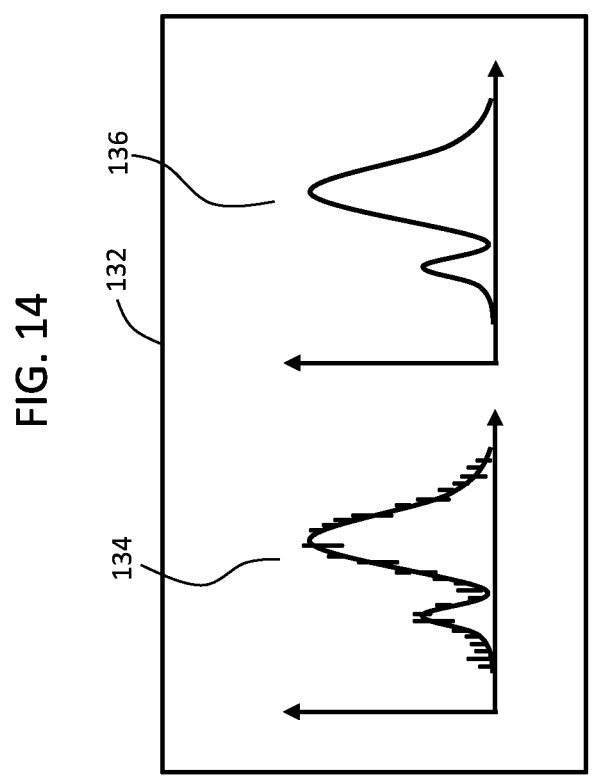
FIG. 14 is a diagram showing a second example display.

FIG. 13 shows a first example display. On a display screen 126, a map 128 obtained in the preliminary measurement and a spectrum 130 obtained in the main measurement are displayed. FIG. 14 shows a second example display. On a display screen 132, a spectrum 134 before passing through the noise filter unit and a spectrum 136 after passing through the noise filter unit are displayed. By providing such a display, the effect of the noise filter unit can be confirmed visually.

In the above-described embodiments, measurement points are switched by the movement of both or either one of the movable stage and the electron beam. At the time displaying a spectrum obtained in the main measurement, an evaluation value regarding the spectral shape (i.e., an index indicating a chemical bonding state) may be calculated and displayed. Instead of a diffraction grating, a crystal may be employed. Instead of a CCD camera, a C-MOS camera may be employed. As a raw spectrum, an artificially-generated spectrum may be used. In generating noise, methods other than that describe above can be used. The noise amplitude may be varied randomly.

The invention claimed is:

1. An X-ray measurement apparatus, comprising:
a controller configured to set a group of preliminary measurement points on a sample in a preliminary measurement, and set a main measurement point on the sample in a main measurement after the preliminary measurement, wherein the group of preliminary measurement points is a two-dimensional array of preliminary measurement points;
a generator configured to generate, in the preliminary measurement, a group of X-ray spectrums based on a group of detected signals obtained by detecting a group of X-rays emitted from the group of preliminary measurement points, and generate, in the main measurement, an X-ray spectrum based on a detected signal obtained by detecting X-rays emitted from the main measurement point;
a noise filter unit having at least one noise filter configured to reduce noise included in each X-ray spectrum of the group of X-ray spectrums in the preliminary measurement and provided exclusively for screening the preliminary measurement points to determine the main measurement point;
a processor configured to process, in the preliminary measurement, respective X-ray spectrums that are output from the noise filter unit, and process, in the main measurement, the X-ray spectrum that has bypassed the noise filter unit; and
a map generator configured to generate a map showing a composition distribution of the sample based on a result of analysis of the group of X-ray spectrums, wherein the main measurement point is determined based on the map.

2. The X-ray measurement apparatus according to claim 1, wherein
the at least one noise filter comprises a machine learning type filter that exhibits a noise reducing effect.

3. The X-ray measurement apparatus according to claim 1, wherein
a measurement time for each of the preliminary measurement points in the preliminary measurement is shorter than a measurement time for the main measurement point in the main measurement.

4. The X-ray measurement apparatus according to claim 1, comprising
an X-ray measurement unit, which comprises a plurality of wavelength dispersion devices that are selectively used, and which is configured to detect characteristic X-rays using a wavelength dispersion device selected from among the plurality of wavelength dispersion devices, wherein
the noise filter unit has a plurality of noise filters corresponding to the plurality of wavelength dispersion devices, and
from among the plurality of noise filters, a noise filter corresponding to the selected wavelength dispersion device is selected.

5. An X-ray measurement method, comprising:
a preliminary measurement process comprising generating a group of characteristic X-ray spectrums based on a group of detected signals obtained by detecting a group of characteristic X-rays emitted from a group of preliminary measurement points set on a sample, inputting the group of characteristic X-ray spectrums into a noise filter unit, and analyzing a group of characteristic X-ray spectrums that are output from the noise filter unit, wherein the group of preliminary measurement points is a two-dimensional array of preliminary measurement points;
a setting process of setting a main measurement point on the sample in a main measurement after the preliminary measurement based on a result of analysis of the group of characteristic X-ray spectrums;
a main measurement process comprising generating a characteristic X-ray spectrum based on a detected signal obtained by detecting characteristic X-rays emitted from the main measurement point, and analyzing or displaying the characteristic X-ray spectrum without transmitting the characteristic X-ray spectrum to the noise filter unit; and a map generating process comprising generating a map showing a composition distribution of the sampled based on a result of analysis of the group of characteristic X-ray spectrums, wherein the main measurement point is determined based on the map.

6. The X-ray measurement method according to claim 5, comprising:

a filter generation process of generating, before the preliminary measurement process, a machine learning type filter comprised in the noise filter unit, wherein
the filter generation process comprises:
generating a plurality of sets of teacher data; and
supplying the plurality of sets of teacher data to the machine learning type filter and causing the machine learning type filter to perform learning, and
each of the sets of teacher data is constituted of a characteristic X-ray spectrum serving as a correct answer data, and a noise-containing characteristic X-ray spectrum generated by adding artificially-generated noise to the characteristic X-ray spectrum.

7. A program stored in a non-transitory storage medium and configured to be executed by an information processing device, the program having:

a function of generating, in a preliminary measurement, a group of X-ray spectrums based on a group of detected signals obtained by detecting a group of X-rays emitted from a group of preliminary measurement points set on a sample, and generating, in a main measurement, an X-ray spectrum based on a detected signal obtained by detecting X-rays emitted from a main measurement point set on the sample in the main measurement after the preliminary measurement, wherein the group of preliminary measurement points is a two-dimensional array of preliminary measurement points;

a function of applying a noise reduction filter configured to reduce noise included in each X-ray spectrum of the group of X-ray spectrums in the preliminary measurement and provided exclusively for screening the preliminary measurement points to determine the main measurement point;

a function of processing, in the preliminary measurement, a group of X-ray spectrums to which the noise reduction processing has been applied, and processing, in the main measurement, the X-ray spectrum that has bypassed the noise reduction processing; and a function of generating, by a map generator, a map showing a composition distribution of the sample based on a result of analysis of the group of X-ray spectrums, wherein the main measurement point is determined based on the map.

* * * * *